United States Patent [19]

Yokoyama et al.

[11] Patent Number: 4,942,534

[45] Date of Patent: Jul. 17, 1990

[54] SIGNAL-TRANSMISSION TYPE PRODUCTION SUPERVISING SYSTEM INCLUDING IC CARD AND WIRELESS TYPE INTERFACE UNIT

[75] Inventors: Masaharu Yokoyama, Sagamigara; Koichi Ogino, Tokyo; Hidetaka Suzuki, Yokogama, all of Japan

[73] Assignee: Nissan Motor Company, Limited, Yokohama, Japan

[21] Appl. No.: 278,888

[22] Filed: Dec. 2, 1988

[30] Foreign Application Priority Data

Dec. 8, 1987 [JP] Japan .................. 62-308776

[51] Int. Cl.$^5$ .................. G06F 13/11; B62D 63/02
[52] U.S. Cl. .................. 364/468; 364/138; 340/825.06
[58] Field of Search ........... 364/468, 478, 138, 571.04; 235/375, 376, 380, 492; 340/825.13, 825.06, 825.72

[56] References Cited

U.S. PATENT DOCUMENTS

| | | | |
|---|---|---|---|
| 4,553,267 | 11/1985 | Crimmins | 455/600 |
| 4,746,787 | 5/1988 | Sato et al. | 235/379 |
| 4,748,320 | 5/1988 | Yorimoto et al. | 235/492 |
| 4,777,329 | 10/1988 | Mallicoat | 178/18 |
| 4,821,198 | 4/1989 | Takeuchi et al. | 364/468 |

FOREIGN PATENT DOCUMENTS 61-168460 1/1985 Japan .

*Primary Examiner*—Jerry Smith
*Assistant Examiner*—Paul Gordon
*Attorney, Agent, or Firm*—Foley & Lardner, Schwartz, Jeffery, Schwaab, Mack, Blumenthal & Evans

[57] ABSTRACT

In a production supervising system of a work, a wireless type production supervising data processing apparatus is mounted on the work. The wireless type production supervising data processing apparatus includes a wireless type interface unit, and an IC card. The IC card includes CPU, EEPROM for storing the production supervising data, ROM for storing the program data, and RAM capable of storing other data than the production supervising data. The wireless type interface unit includes antennas, a receiver, a transmitter, a demodulator connected to the receiver, and a modulator connected to the transmitter. During the production of the work, the production supervising data previously stored in EEPROM are read from the IC card and processed in the interface unit and thereafter transmitted from the interface unit toward the external data controlling apparatus.

12 Claims, 6 Drawing Sheets

SIGNAL-TRANSMISSION TYPE PRODUCTION SUPERVISING DATA PROCESSING APPARATUS 200

SIGNAL-TRANSMISSION TYPE PRODUCTION SUPERVISING SYSTEM INCLUDING IC CARD AND WIRELESS TYPE INTERFACE UNIT

BACKGROUND OF THE INVENTION

1. Field of the Invention

The present invention generally relates to a signal-transmission type production supervising system used in a production line of a work such as automotive vehicles and the like. More specifically, the present invention is directed to a signal-transmission type production supervising data processing/storage apparatus employing an IC card and a production-supervising data transmitter/receiver to which the IC card is coupled.

2. Description of the Related Art

Very recently, many attempts have been made to utilize signal-transmission production supervising systems in production lines of works such as automotive vehicles and home appliances. In such a signal-transmission production supervising system, the production supervising data of the work are previously stored in a data storage device, e.g., a specific IC (integrated circuit) card, and a specific ID (identification) card. This data storage device also includes a signal transmitter/receiver. The data storage device is mounted on the work, which is sequentially transported along the production line in the factory. During the manufacturing process, production supervising data previously stored in the data storage device are read out by way of the proper signal transmitting medium, for instance, electromagnetic waves, infrared light waves, ultrasonic waves and so on by the external data control apparatus. Also other production supervising data are transmitted from the external data control apparatus to the data storage device and stored therein. Such a data communication is performed at successive manufacturing stages in the production line.

In FIG. 1, there is shown one conventional data storage/processing device utilized as the above-described signal-transmission production supervising system. This data storage/processing device is mainly constructed of a signal receiving section, a data processing section, and a signal transmitting section. The signal receiving section includes an antenna 1, a receiver unit 2, and a demodulator 4. The data processing section includes an input port 4, a central processing unit (CPU) 5, a memory 6, and an output port 7. The signal transmitting section includes a modulator 8, a transmitter 9 and an antenna 10. The antenna 1 of the signal receiving section receives a data signal transmitted from the external control data apparatus in the signal-transmission type production supervising system. Then, this data signal is amplified in the receiver unit 2 and a demodulated data signal is supplied via the input port 4 and a data bus to CPU 5. This CPU 5 processes this data signal and transfers the processed data signal to the memory 6 for the storage purpose. On the other hand, the production supervising data previously stored in the memory 6 are read out from the memory 6. The readout data are sent via the data bus and output port 7 to the demodulator 8. Then, the readout data are modulated in the modulator 8 and transmitted by means of the transmitter unit 9 and antenna 10 to the external data control apparatus. Acccordingly, the production supervising information is communicated between this data storage/processing device and the external data control apparatus in order to supervise the production line.

As previously described, the above-described data storage/processing device, i.e., the signal-transmission type IC card has the following advantages that the work on which the signal-transmission type IC card has been mounted, is no longer required to be stopped at the respective manufacturing stages of the production line while the production supervising data are accessed to the memory 6. In addition, since the production supervising data are sent by way of the signal transmission method from the IC card to the external data control apparatus and vice versa, the external data control apparatus can readily access to the desired work, resulting in higher productivity in the factory.

However, the signal-transmission IC card has the following drawbacks. That is, a specific card reading apparatus is required to access the IC card. For instance, when the above-described signal-transmission type production supervising system is utilized in the production supervision of the automobile industries, the quality information of the automobile is previously stored in the IC card. In addition, the historical data of this automobile are stored in this IC card. Both the production quality information and historical (e.g., maintenance) data are provided for not only the car manufacturer but also the car dealer and car user. However, since such a specific card reading apparatus is not so easily available for both the car dealer and car user, these data are not readily accessed.

The non-wireless-signal-transmission production supervising system employing the commercially available IC card is also known. Since the quality information data previously stored in the IC card can be accessed by the general-purpose IC card reader, both the car dealer and car user can readily access the quality information data and other necessary data. However, the non-wireless-signal-transmission IC card has the following disadvantages. When, for instance, this IC card is utilized in the automobile production line, it is required to stop the automobile under production at the respective manufacturing stages so as to access the production quality data from this IC card. Moreover, as the IC card employs the contact terminals, these contact terminals are soiled by an oil or dust in the factory, because these terminals are exposed. The electrical connection between the IC card and card reader will deteriorate.

The present invention has been made to solve these conventional problems, and, therefore, has as an object to provide a novel signal-transmission type production supervising data processing apparatus from which the desired production supervising data are utilized for not only a manufacturer, but also an end user.

Another object of the invention is to provide a signal-transmission type production supervising data processing apparatus, the production supervising data of which are not easily forged, or changed by an unauthorized person.

Still another object of the present invention is to provide a signal-transmission type production supervising data processing apparatus capable of storing not only the production supervising data, but also the user's data such as repair history data and maintenance data.

SUMMARY OF THE INVENTION

To achieve the above-described objects and other features of the invention, the signal-transmission type production supervising data processing apparatus(100:200:300) electrically, optically, or ultrasonically communicated with an external data controlling apparatus (56) comprising:

a data processing/storing unit (112:400) for processing an input control signal and storing production supervising data therein; and, an interface unit (111:211:311) detachably and electrically, or optically coupled to the data processing/storing unit (112:400), for receiving a control signal transmitted from the external data controlling apparatus (56) to convert the control signal into the input control signal for the production supervising data processing/storing unit (112:400), and for transmitting the production supervising data read out from the production supervising data processing/storing unit toward the external data controlling apparatus (56) while the production supervising data processing/storing unit (112:400) is electrically, or optically connected to the interface unit (111:211 :311).

DETAILED DESCRIPTION OF THE PREFERRED EMBODIMENTS

Construction of First Signal-Transmission Type Production Supervising Data Processing Apparatus Referring now to FIGS. 2A and 2B, a construction of a singal-transmission type production supervising data processing/storage apparatus 100 according to a first preferred embodiment of the invention will be described.

Figure 1:
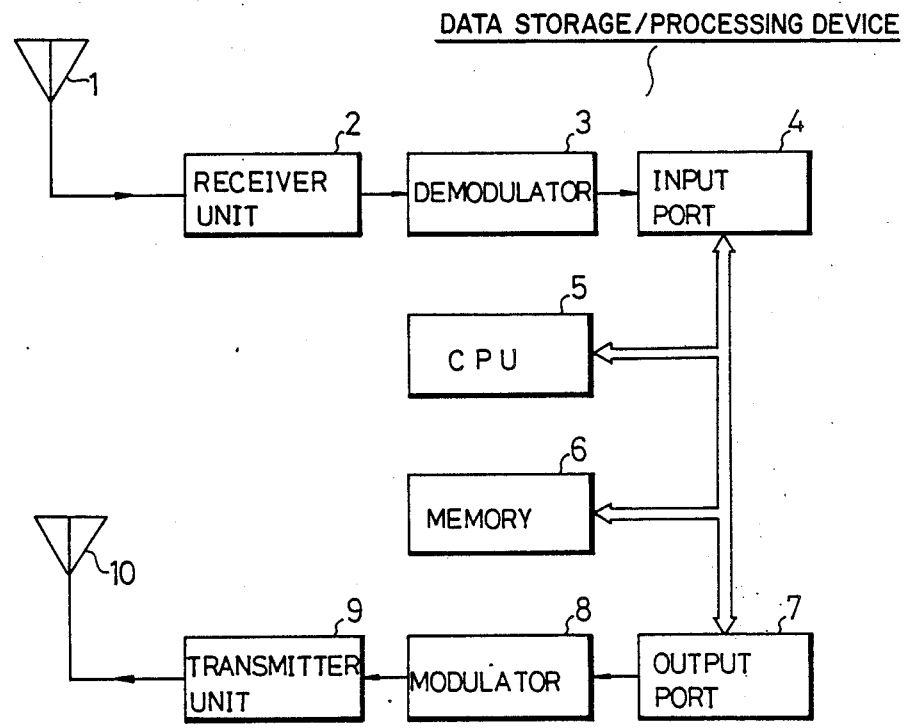
FIG. 1 is a schematic block diagram of a conventional signal-transmission type production supervising system.
Figure 2:
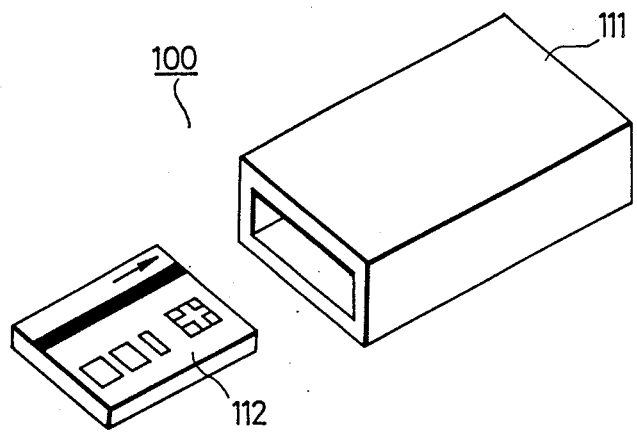
FIG. 2A is a perspective view of a signal-transmission type production supervising data processing/storage apparatus 100 according to a first preferred embodiment of the invention.
FIG. 2B is a cross sectional view of the signal-transmission type production supervising data processing apparatus 100 shown in FIG. 2A.
Figure 2:
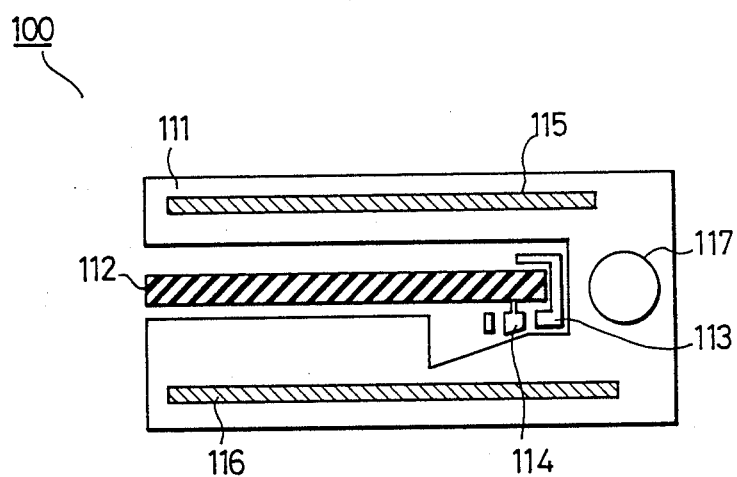

FIG. 2A is a perspective view of the data processing/storage apparatus 100 and FIG. 2B is a cross sectional view of the data processing apparatus 100.

This signal-transmission type production supervising data processing apparatus 100 is mainly arranged by an interface unit 111 and an IC(integrated circuit) card 112. This IC card 111 is of a commercially available IC card used in, for instance, finance firms. In the first preferred embodiment, the signal-transmission type production supervising data processing apparatus (also referred to as "a wireless type production supervising data processing apparatus") 100 utilizes electromagnetic waves as the signal transmitting medium such as radio-frequency electromagnetic waves so as to transmit and receive the production supervising data and/or other data to and from the external data controlling apparatus. It should be noted that since the above-described IC card 112 is of the commercially available IC card, neither a transmitter nor a receiver is built therein. The transmitter, receiver, modulator and demodulator are employed in the interface unit 111 according to the invention.

When the IC card 112 is inserted into the inside of the interface unit 111, a connecting terminal (not shown in detail) of the IC card 112 is electrically connected via another connecting terminal 114 of the interface unit 111 to electronic circuitry of the interface unit 111. Then, both the IC card 112 and interface unit 111 function as the above-described wireless type production supervising data processing apparatus 100 which is mounted on a work, e.g., an automobile under production (as will be discussed later).

As illustrated in FIG. 2B, the interface unit 111 includes a holder 113 for holding one end of the IC card 12 when being inserted, and the connecting terminal 114. As previously described, this connecting terminal 114 is elastically in contact with the above-mentioned connecting terminal of the IC card 112 so as to establish the electric connection between the IC card 112 and interface unit 111. The interface unit 111 further includes an interface section 115 connected to the connecting terminal 114, a transmitter/receiver section 116 coupled to the interface section 115, and a battery 117 for supplying DC power to the interface section 115 and transmitter/receiver section 116. Then, the production supervising data are received from the external data controlling apparatus (not shown) by the interface unit 111, and processed and stored in the IC card 112. Conversely, the data stored in the IC card 112 are read out from the IC card 112 and converted into the proper data by the interface unit 111, and thereafter the properly converted data are transmitted to the external controlling unit.

CIRCUIT ARRANGEMENT OF DATA PROCESSING APPARATUS 100

A detailed circuit arrangement of the wireless type production supervising data processing/storage apparatus 100 according to the first preferred embodiment will now be described with reference to FIG. 3.

The transmitter/receiver section 116 includes a receiver antenna 118, a transmitter antenna 119, a receiver 120, a demodulator 121, a transmitter 122, and a modulator 123. The receiver 120 and demodulator 121 are series-connected to the receiver antenna 118. The transmitter 122 and modulator 123 are series-connected to the transmitter antenna 119. The interface section 115 includes a receiver interface circuit 124 connected to the demodulator 121, and a transmitter interface circuit 125 connected to the modulator 123.

On the other hand, the IC card 112 includes a serial-data input port 126, a serial-data output port 127, a central processing unit (CPU) 128, a read only memory (ROM) 129, a random access memory (RAM) 130, an electrically erasable and programmable ROM (EEPROM) 131. These circuits are connected with each other via a data bus 132.

These serial-data input/output ports 126 and 127 are connected via the above-described connecting terminal 114 and another connecting terminal of the IC card 112 to the receiver interface circuit 124 and transmitter interface circuit 125 respectively. CPU 128 processes the control signals input from the external controlling apparatus via the interface unit 111 and supervises the production supervising data. ROM 129 stores the program for controlling this CPU 128. EEPROM 131 stores the information (i.e., production supervising data) specific to the IC card 112, RAM 130 stacks the variables used in CPU 128.

OVERALL OPERATION OF FIRST SIGNAL-TRANSMISSION TYPE PRODUCTION SUPERVISING DATA PROCESSING APPARATUS

A description will now be made of the overall operation of the signal-transmission type production supervising data processing/storage apparatus 100 shown in FIG. 3.

Figure 4:
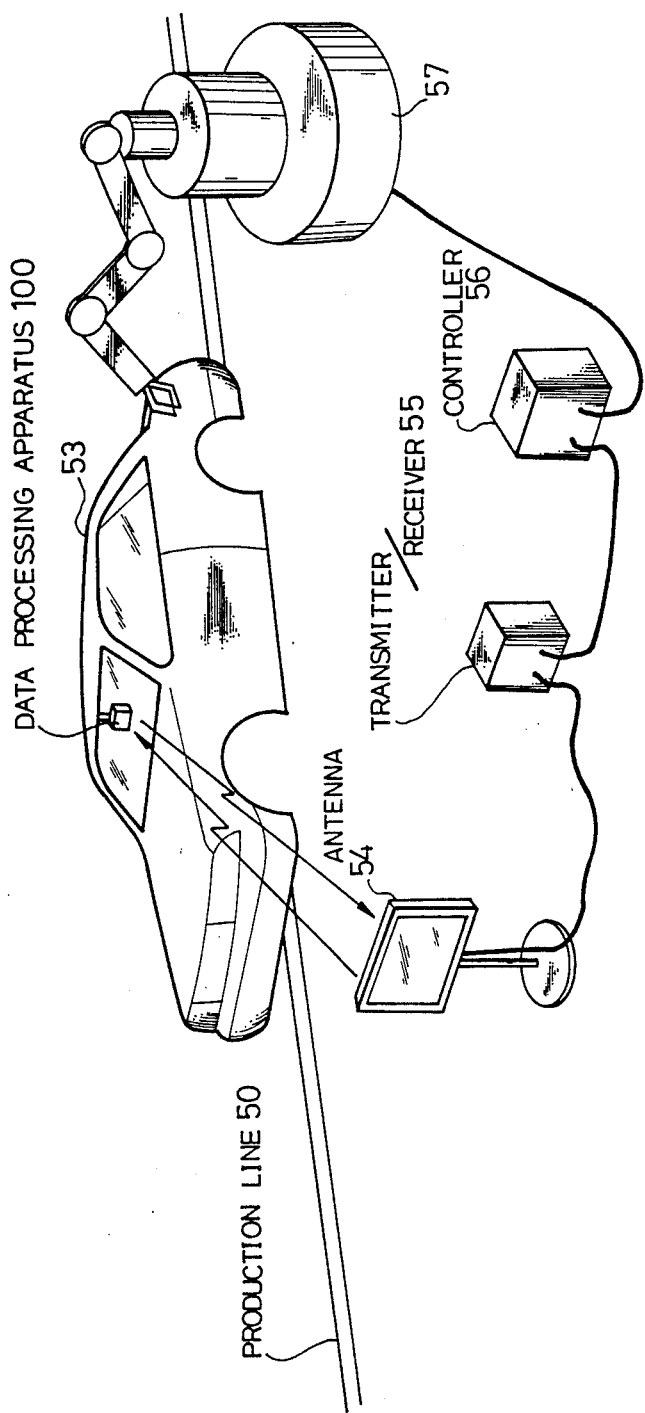
FIG. 4 schematically illustrates an automobile production line into which the signal-transmission type production supervising data processing/storage apparatus 100 is applied.

The control signal from the external data controlling apparatus (shown in FIG. 4) is received via the receiver antenna 118 by the receiver 120. The received control signal is amplified to a predetermined amplitude level in the receiver 120. Then, the amplified signal is supplied to the demodulator 121. This analog signal is converted into the corresponding digital control signal in the demodulator 121. The digital signal is inputted into the receiver interface circuit 124 in which the signal level thereof is properly changed so as to be processed in the IC card 112. The digital signal, the signal level of which has been adjusted, is supplied via the connecting terminal 114 of the interface unit 111 (see FIG. 2B) and another connecting terminal of the IC card 112 to the serial-data input port 126 of the IC card 112. Then, CPU 128 receives this digital control signal from the input port 126 via the data bus 132. Under the control of CPU 128, various process operations are performed in this IC card 112. The digital control signal is stored in RAM 130 if necessary.

A digital information signal specific to the IC card 112 or a work to be assembled (i.e., production supervising data) is read out from EEPROM 131 under the control of CPU 128, and supplied via the data bus 132, serial-data output port 127, and two connecting terminals to the transmitter interface circuit 125. The signal level of this digital information signal is converted into the proper signal level. Thereafter the level-changed digital signal is supplied to the modulator 123. In the modulator 123, this digital information signal is converted by way of the frequency shift keying (FSK) modulation method into a corresponding analog information signal. Then, this analog information signal is amplified at a predetermined amplification in the transmitter 122. Then, the amplified analog information signal is transmitted through the transmitter antenna 119 toward the external data controlling apparatus.

APPLICATION IN AUTOMOBILE PRODUCTION LINE

The above-described signal-transmission type production supervising data processing/storage apparatus 100 may be applied in an automobile production line 50. The wireless type production supervising data processing apparatus 100 is mounted inside the automobile 53, e.g., adjacent to the windshield. The IC card 112 is detachably inserted into the interface unit 111, thus constituting this data processing apparatus 100.

Along the automobile production line 50, there are provided an antenna 54, a transmitter/receiver device 55, a controller 56 and an industrial robot 57 at each manufacturing stage thereof.

When the automobile 53 to be assembled is brought to a certain manufacturing stage of the production line 50, the production supervising data specific to this work 53 which have been previously stored in EEPROM 131 of the IC card 112, are transferred from the transmitter 122 in the interface unit 111 of the data processing/storage apparatus 100. The production supervising data are received by the antenna 54, and processed in the transmitter/receiver device 55. Thus, the processed production supervising data are furnished to the controller 56. Based upon the production supervising data, the industrial robot 57 is controlled by the controller 56 to performs a predetermined manufacturing operation.

In addition, the quality information data relating to the respective manufacturing stages, the control signal and the information data concerning the important maintenance part numbers or the like are transmitted from the controller 56 via the transmitter/receiver device 55 and antenna 54 to the data processing apparatus 100. These information data are stored in RAM 130 of the IC card 112 (see FIG. 3).

After the automobile 53 is assembled, the IC card 112 is taken out from the interface unit 111, into which the above-described quality information data and the like have been stored. For instance, this IC card 112 may be given to an end user of this automobile 53. As a result, the various information data may be readily read out by a commercially available card reader/writer installed in a car dealer and/or a gas station. Maintenance or repairing service may be readily given based upon the above-described data read from the IC card 112. Moreover, contents of the maintenance and/or repairing service may be written as a maintenance supervising record into RAM 130 of this IC card 112.

As previously described, this IC card 112 can have two functions. That is, when combined with the interface unit 111, the IC card 112 can be utilized so as to supervise conditions of a production line in a car manufacturing factory. Furthermore, this IC card 112 can readily provide various information data specific to an automobile 53 to an end user by employing a commercially available card reader/writer. In addition, the interface unit 111 of the data processing apparatus 100 may be repeatedly used in the automobile manufacturing factory.

SECOND SIGNAL-TRANSMISSION TYPE PRODUCTION SUPERVISING DATA PROCESSING/STORAGE APPARATUS

Figure 5:
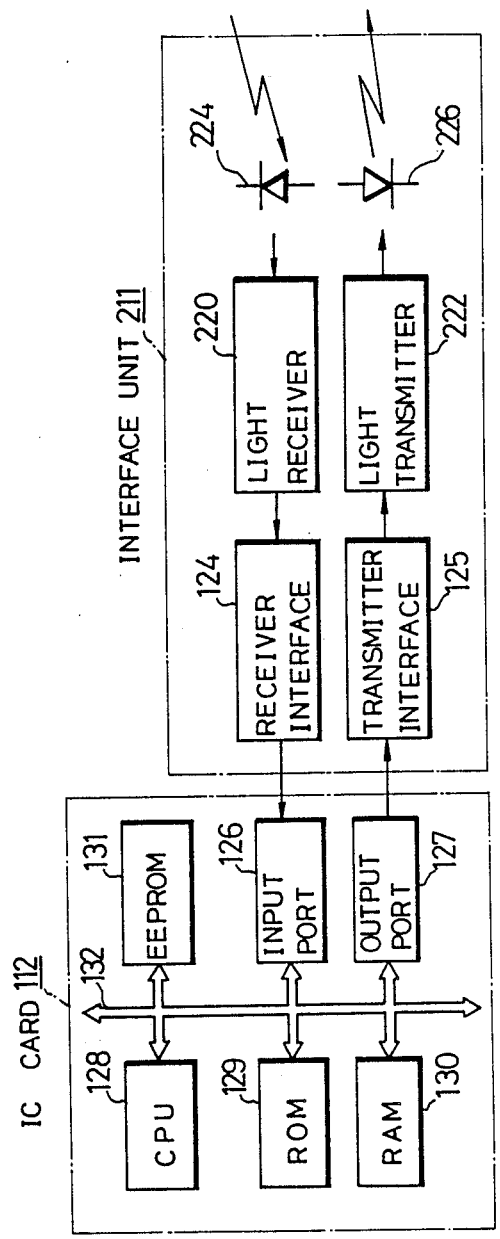
FIG. 5 is a schematic block diagram of an internal circuit of a signal-transmission type production supervising data processing/storage apparatus 200 according to a second preferred embodiment of the invention.

Referring now to FIG. 5, a signal-transmission type production supervising data processing/storage apparatus 200 according to a second preferred embodiment of the invention will be described.

Figure 3:
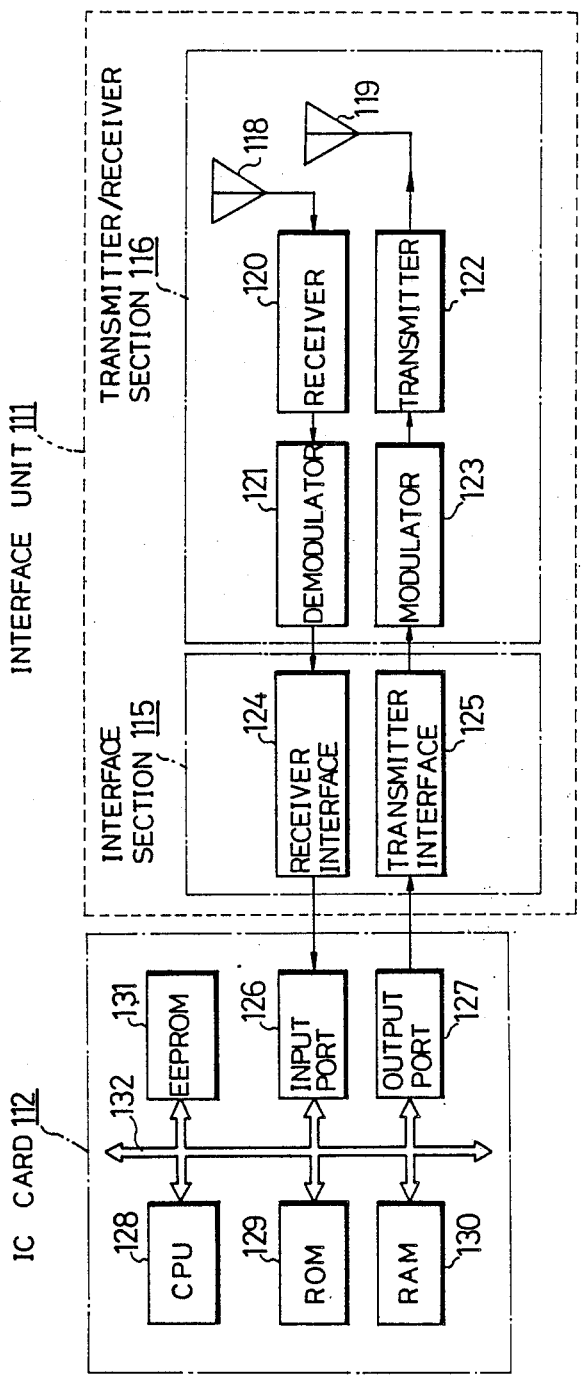
FIG. 3 is a schematic block diagram of an internal circuit of the signal-transmission type production supervising data processing/storage apparatus 100.

It should be noted that the first signal-transmission type production supervising data processing apparatus 100 shown in FIG. 3 utilizes electromagnetic waves as the signal transmitting medium, whereas the second signal-transmission type production supervising data processing apparatus 200 shown in FIG. 5 employs infrared light waves. It is apparent that visual light and other proper light waves may be alternatively utilized in the second signal-transmission type production supervising data processing apparatus 200 (simply referred to as "an optical signal-transmission type data processing/storage apparatus").

The optical signal-transmission type production supervising data processing apparatus 200 is constructed of the normal IC card 112 and an interface unit 211. Since the same IC card 112 as in the first preferred embodiment shown in FIG. 3 can be employed in this optical signal-transmission type data processing/storage apparatus 200, no detailed explanation thereof will be made in the following descriptions.

As shown in FIG. 5, the interface unit 211 is constructed of a light receiving system and a light transmitting system. The light receiving system includes a light receiving element 224, e.g., a photo-transistor and a photodiode; a light receiver 222 connected to receive the optical output signal from the light receiving element 224; and the receiver interface circuit 124 connected to the light receiver 220. This interface circuit 124 is similarly coupled via the connecting terminals (see FIG. 2B) to the input port 126 of the IC card 112. On the other hand, the light transmitting system includes the interface circuit 125 coupled to the output port 127 of the IC card 112 via the connecting terminals (see FIG. 2B); a light transmitter 222 connected to the interface circuit 125; and a light transmitting element 226, e.g., a light emitting diode connected to the light transmitter 222.

Operations of the optical signal-transmission type production supervising data processing apparatus 200 will now be summarized. An optical control signal transmitted from an external data controlling apparatus (not shown in detail) employed in a production line, is received by the light receiving element 224 to produce the optical control output signal. The optical control output signal is, for instance, amplified in the optical receiver 222 and thereafter sent to the IC card 112 after being properly-processed in the receiver interface circuit 124. When the production supervising data are read out from EEPROM 131 of the IC card 112, the data are supplied via the data bus 132, output port 127 and interface circuit 125 to the light transmitter 222. The data are processed in the light transmitter 222 to produce an optical production supervising data signal. This optical data signal is supplied to the light transmitting element 226 so as to transmit the optical data signal to the above-described external data controlling apparatus.

THIRD SIGNAL-TRANSMISSION TYPE PRODUCTION SUPERVISING DATA PROCESSING/STORAGE APPARATUS

Figures 6, 7:
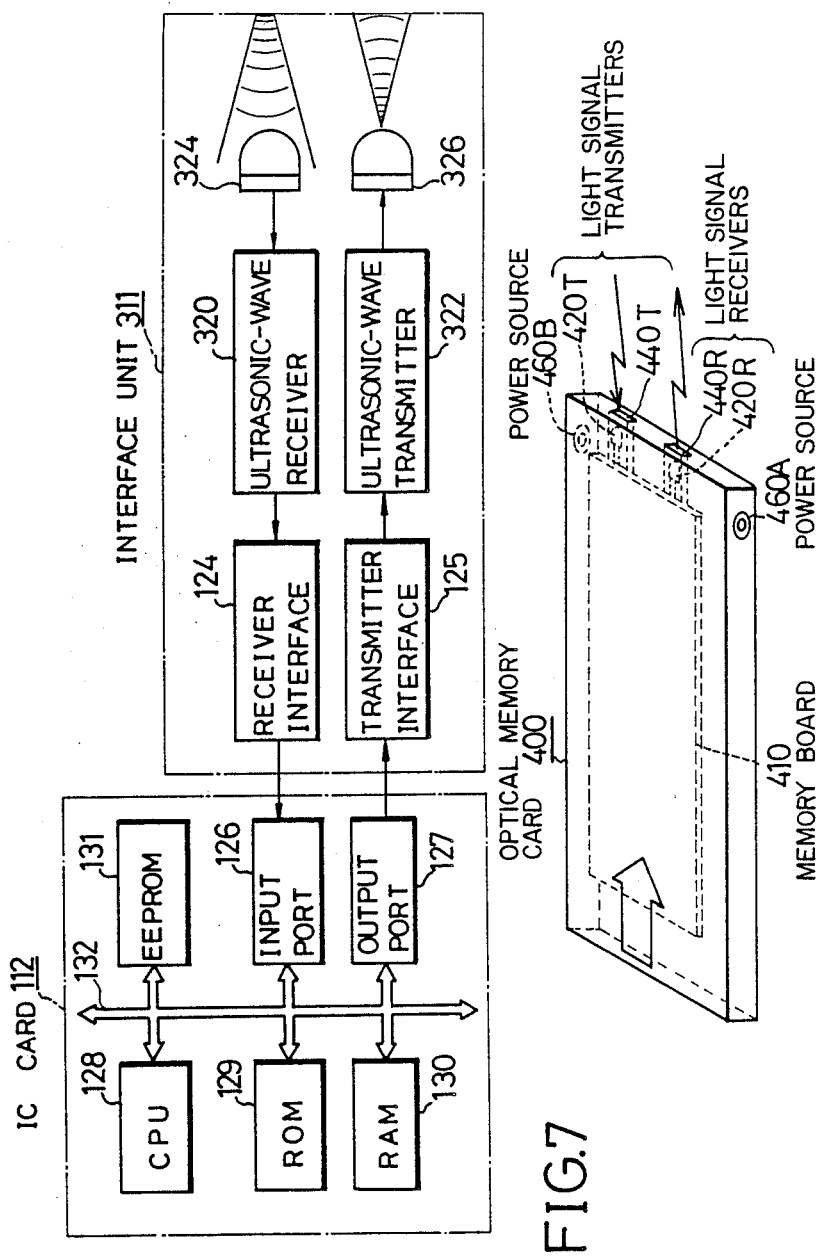
FIG. 6 is a schematic block diagram of an internal circuit of a signal-transmission type production supervising data processing/storage apparatus 300 according to a third preferred embodiment of the invention; and, FIG. 7 schematically illustrates an optical memory card employed in the data processing/storage apparatus according to the invention.

In FIG. 6, there is shown a signal-transmission type production supervising data processing apparatus 300 according to a third preferred embodiment of the invention.

The third data processing apparatus 300 utilizes ultrasonic waves as the signal transmitting medium. Similarly, as the same IC card 112 can be employed in this data processing/storage apparatus 300, no further description thereof is made here. The third data processing apparatus 300 is arranged by the normal IC card 112 and an interface unit 311. The interface unit 311 includes an ultrasonic receiving element 324; an ultrasonic-wave receiver 320; the receiver interface circuit 124; the transmitter interface circuit 125; an ultrasonic-wave transmitter 322; and an ultrasonic transmitting element 326.

While an external data controlling apparatus (not shown in detail) transmits an ultrasonic control signal to the third data processing apparatus 300, the ultrasonic receiving element 324 receives this ultrasonic control signal and outputs an ultrasonic control output signal. The ultrasonic control output signal is processed in the ultrasonic-wave receiver 320 and then supplied via the receiver interface circuit 124 and connecting terminals (see FIG. 2B) to the IC card 112. On the other hand, the production supervising data read out from EEPROM 131 of the IC card 112 are sent via the output port 127 and transmitter interface circuit 125 to the ultrasonic-wave transmitter 322. The production supervising data are converted into proper supervising data signals in the ultrasonic-wave transmitter 322. Then, the supervising data signals are supplied to the ultrasonic transmitting element 326. Accordingly, ultrasonic supervising data signals are emitted from the ultrasonic transmitting element 326 toward the external data controlling apparatus.

MODIFICATIONS

Various modification may be realized according to the present invention.

In, for instance, the above-described preferred embodiments, the commercially available IC card is employed. Very recently, a so-called "optical memory card" has been developed and used in the field. A construction of one typical optical memory card will now be explained with reference to FIG. 7. An memory card 400 having an optical input is mainly constructed of a memory board 410 and a pair of light signal transmitter/receiver 420T and 420R. The memory board 415 includes CPU, ROM, RAM, EEPROM and so on. A pair of light signal transmitter/receiver 420T and 420R are separatedly mounted in one edge of the memory card 400. Windows 440T and 440R are formed around the corresponding light signal transmitter 420T and receiver 420R. Power source terminals 460A and 460B are formed on opposite sides of the memory card 400.

Since this memory card 400 can be optically communicated with an interface unit of the signal-transmission type production supervising data processing apparatus according to the invention, a connecting terminal such as the terminal 114 shown in FIG. 2B is no longer required.

Furthermore, although the transmitter antenna 119 and receiver antenna 118 are separatedly employed in the first preferred embodiment shown in FIG. 3, a single common antenna may be utilized for the signal transmission and reception. In the interface unit 111 shown in FIG. 2B, the battery 117 is built therein. However, a battery may be alternatively built in the IC card 112, so that no battery 117 is employed in the interface unit 111.

While the present invention has been described above, the IC card can be detachably coupled to the interface unit, and also the interface unit constituting the production supervising data processing apparatus in combination with the IC card can be operated under the signal transmission system, e.g., radio-frequency waves, microwaves, ultrasonic waves and light waves. As a consequence, the production supervising data can be continuously transmitted and/or received to/from the data processing apparatus mounted on the work to be assembled in the production line. In other words, the work on which the data processing apparatus has been mounted needs not be stopped at the respective manufacturing stages of the production line, resulting in the higher productivity of the production line.

Since the IC card has neither a transmitter nor a receiver, this IC card can be formed in a small size at lower cost. Also a compact and light-weight IC card is available for an end user of the work. Moreover, both a manufacturer and a user can supervise the various information specified to a work in totality. Accordingly, the total quality control can be improved at lower cost, and the high grade service for end users can be achieved.

Since the contact terminals of the IC card (data storage card) are not exposed in a production line, these terminals are not soiled by an oil or dust in a factory. In addition, as the IC card may be mechanically locked into the interface unit, the production supervising data and other data stored in the IC card are not easily forged, or changed by an unauthorized person.

What is claimed is:

1. A data processing apparatus comprising:
    an IC (integrated circuit) card including a central processing unit, a first memory unit for storing program data for operating said central processing unit; a second memory unit for storing production supervising data, a third memory unit capable of storing data other than said production supervising data, and said other data being transferred from an external data controlling apparatus; and,
    interface means detachably coupled to said IC card for receiving at least an instruction signal transmitted from said external data controlling apparatus to convert said instruction signal into a production supervising data read signal, whereby said production supervising data read signal is processed by the central processing unit so as to read said production supervising data from said second memory unit, and for transmitting said production supervising data read from said second memory unit via said interface means to said external data controlling apparatus, while said IC card is electrically connected to said interface means.

2. A signal-transmission production supervising data processing apparatus as claimed in claim 1, wherein said data processing/storing means is an IC card including at least a central processing unit, a first memory unit for previously storing program data for operating said central processing unit; and a second memory unit for storing said production supervising data.

3. A data processing apparatus as claimed in claim 2, wherein said IC card further comprises a third memory unit capable of storing any data other than said production supervising data, said first-mentioned data being transferred from said data external controlling apparatus, and an input/output port for communicating at least said production supervising data with said interface means.

4. A data processing apparatus as claimed in claim 2, wherein said IC card further includes a first electric contact terminal connected to said central processing unit and first memory unit; and said interface means further includes a second electric terminal contact, said first electric contact terminal being detachably and electrically coupled to said second electric contact terminal so as to communicate said production supervising data between said interface means and IC card.

5. A data processing apparatus as claimed in claim 1, wherein said interface means includes:
    a wireless type receiver section for receiving said control signal sent from said external data controlling apparatus; and,
    a wireless type transmitter section for transmitting said production supervising data read out from said production supervising data processing/storing means toward said external data controlling apparatus.

6. A data processing apparatus as claimed in claim 5, wherein said wireless type receiver section includes:
    a receiving antenna, a receiver, and a demodulator; and said wireless type transmitter section includes:
    a transmitting antenna, a transmitter, and a modulator.

7. A data processing apparatus as claimed in claim 1, wherein said interface means includes;
    an optical signal-transmission type receiver unit for optically receiving said control signal sent from said external data controlling apparatus; and,
    an optical signal-transmission type transmitter unit for optically transmitting said production supervising data derived from said production supervising data processing/storing means to said external data controlling apparatus.

8. A data processing apparatus as claimed in claim 7, wherein said optical signal-transmission type receiver unit includes a light receiving element and a light receiver; and said optical signal-transmission type transmitter unit includes a light transmitting element and a light transmitter unit.

9. A data processing apparatus as claimed in claim 8, wherein said light receiving element is an infrared photodiode, and said light transmitting element is an infrared light emitting diode.

10. A data processing apparatus as claimed in claim 1, wherein said interface means includes:
    an ultrasonic signal-transmission type receiver unit for ultrasonically receiving said control signal transferred from said external controlling apparatus; and,
    an ultrasonic signal-transmission type transmitter unit for ultrasonically transmitting said production supervising data derived from said production supervising data processing/storing means toward said external data controlling apparatus.

11. A data processing apparatus as claimed in claim 10, wherein said ultrasonic signal-transmission type receiver unit includes an ultrasonic receiving element; and said ultrasonic signal-transmission type transmitter unit includes an ultrasonic transmitting element, and an ultrasonic-wave transmitter.

12. A data processing apparatus as claimed in claim 11, wherein said production supervising data processing/storing means is a memory card having an optical input including at least a memory board for storing said input control signal and storing said production supervising data; and a pair of first and second light signal transmitters and receivers; and said interface means includes a pair of third and forth light signal transmitters and receivers for optically communicating said production supervising data and input control signal with said first and second light-signal transmitters and receivers of said memory card.

* * * * *